United States Patent
Walworth

[11] 3,898,678
[45] Aug. 5, 1975

[54] CAMERA TO MICROSCOPE ADAPTOR WITH MEANS FOR OPERATING AN EXPOSURE CONTROL

[75] Inventor: Vivian K. Walworth, Concord, Mass.

[73] Assignee: Polaroid Corporation, Cambridge, Mass.

[22] Filed: Dec. 3, 1973

[21] Appl. No.: 420,915

[52] U.S. Cl. ............ 354/79; 240/1 LP; 350/18; 350/96 R; 354/22
[51] Int. Cl. ........................................ G03b 17/48
[58] Field of Search ......... 354/79, 293, 295, 22, 23; 240/1 LP, 1 EL; 350/18, 19, 36, 96 R

[56] References Cited
UNITED STATES PATENTS

| | | | |
|---|---|---|---|
| 3,106,129 | 10/1963 | Frenk et al. | 354/79 |
| 3,292,490 | 12/1966 | Moore | 354/79 |
| 3,433,940 | 3/1969 | Baez et al. | 350/96 R |
| 3,548,730 | 12/1970 | Verge | 350/19 |
| 3,623,807 | 11/1971 | Gabler | 350/19 |
| 3,721,170 | 3/1973 | Johnson | 354/79 |
| 3,798,665 | 3/1974 | Eloranta | 354/79 |

*Primary Examiner*—Richard L. Moses
*Attorney, Agent, or Firm*—Frederick H. Brustman; John W. Ericson

[57] ABSTRACT

A method for operating an automatic exposure control of a self-contained camera coupled to an image-forming optical instrument without detracting from the brightness of the useful image to be recorded on the camera's film format and an adaptor for carrying out the method. The adaptor includes optical means that extracts a portion of the light emerging from the optical instrument, at a separation between the instrument and the camera, otherwise destined to form an unrecorded portion of the image.

19 Claims, 3 Drawing Figures

PATENTED AUG 5 1975 3,898,678

CAMERA TO MICROSCOPE ADAPTOR WITH MEANS FOR OPERATING AN EXPOSURE CONTROL

BACKGROUND OF THE INVENTION

The invention described herein is particularly useful for adapting a self-contained camera with an automatic exposure control for use with an image-forming optical system such as a microscope. An important consideration in adapting such a camera for photography through a microscope or other instrument is to preserve the automatic exposure control feature without reducing the amount of light available for the photographic exposure of a film unit within the camera.

Prior art arrangements for coupling self-contained cameras to optical instruments propose the diversion of some part of the useful light, light intended for the photographic image, onto the photosensitive detector in the automatic exposure control. Typically, this diversion is accomplished by a beam splitter or similar optical element within the instrument.

U.S. Pat. Nos. 3,130,634 and 3,292,490 exemplify such arrangements. The former shows an arrangement common to the prior art. A beam splitter cube obstructs the entire optical path to the camera. It diverts a large fraction of the light in the useful image to a photoexposure control. The latter patent shows a camera attached to make a photograph through one eyepiece of a binocular microscope and a fiber optic light pipe connecting the other eyepiece of the binocular microscope to the photodetector of the camera's automatic exposure control. The internal optical arrangement of such a microscope diverts about half of the available light to each eyepiece. Thus, it makes light available to actuate an automatic exposure control connected to one eyepiece at the expense of a photograph made through the other eyepiece. A 50% reduction in the illumination of the image, merely to actuate an automatic exposure control, can have a critical effect on a photograph made through an image-forming optical instrument because the amount of light available is generally quite limited.

The prior art also includes photographic microscope systems, such as the Zeiss ULTRAPHOT II. The photographic portion of such a system is integrated with the microscope optics and is neither independently functional nor self-contained. The ULTRAPHOT II has a photodetector at the focal plane outside the boundary of a mask defining its photographic format. The intensity of illumination at the focal plane is the least of any location along the optical path. Moreover, a local anomaly in the magnified image will cause a misleading exposure signal from the system's photodetector if it falls on the photodetector.

OBJECTS AND SUMMARY OF THE INVENTION

An object of the present invention is to provide a method for controlling the exposure of a self-contained photographic camera coupled to an image-forming optical instrument without reducing the brightness of the useful image formed at the camera's film plane.

Another object of the present invention is to provide an adaptor with a means for operating an automatic exposure control of a self-contained photographic camera coupled to an image-forming optical instrument that doesn't reduce the brightness of the instrument's useful image area at the camera's film plane or require modification of either.

Yet another object of the invention is an adaptor, for attaching a camera to an optical instrument, that includes means for extracting light coursing across the interface between the instrument and the camera for the purpose of exposure control.

These and other objects of the invention are achieved by a method that includes the steps of: extracting light, otherwise destined to form a surplus portion of an optical instrument's image (i.e., lying outside the photographic format of a self-contained camera coupled to the instrument), from the optical path of the instrument at the interface between the camera and the instrument and directing that light onto the photodetector of a camera's automatic exposure control or some other light sensor.

An advantage of the present invention over the prior art is that light destined to fall outside the photographic format is extracted from the optical path at a place, between the instrument and the attached camera, where its flux density is high, and where an anomaly in the image will have the least effect. Thus, it makes the most efficient use of the light not falling within the photographic format.

The present invention recognizes and capitalizes in a novel way on the fact that image-forming optical instruments have circular fields, since they are made from spherical optical elements, but that photographic films are made with rectilinear formats. For aesthetic and technical reasons, the circular image formed by an optical instrument is enlarged to fill the corners of the film's rectilinear format. Thus, the chordal segments of the circular image lying outside the rectilinear format are generally surplusage. The invention disclosed herein is predicated on the recognition that the illumination of the surplus chordal segments is indicative of the central image's illumination and the light forming them can be used for other purposes (specifically photo exposure control) without detracting from the recorded image's illumination, quality, or content.

The present invention includes an adaptor for attaching a camera to an optical instrument and means that diverts at least a portion of the light forming a surplus chordal segment at the interface between the instrument and the attached camera and uses it to activate the automatic exposure control of the camera. One advantage of diverting chordal segment light at the interface is that more of it will be incident on a photodetector by comparison with the amount incident on a photodetector located within the chordal segment at the focal plane. Another advantage is that the chordal segment light extracted from the optical path at the interface of the camera and instrument can be used to operate a photo exposure control without modifications to either the self-contained camera or the optical instrument.

One means for accomplishing the foregoing is by using a fiber optic light pipe to conduct the extracted light to the camera's photodetector.

DESCRIPTION OF THE DRAWINGS

Other objects and many of the attendant advantages of the present invention will be better appreciated and the invention will become more clearly understood by reference to the following detailed description when considered in conjunction with the accompanying drawings illustrating the instant invention, wherein.

THE PREFERRED EMBODIMENT OF THE INVENTION

Figure 2:
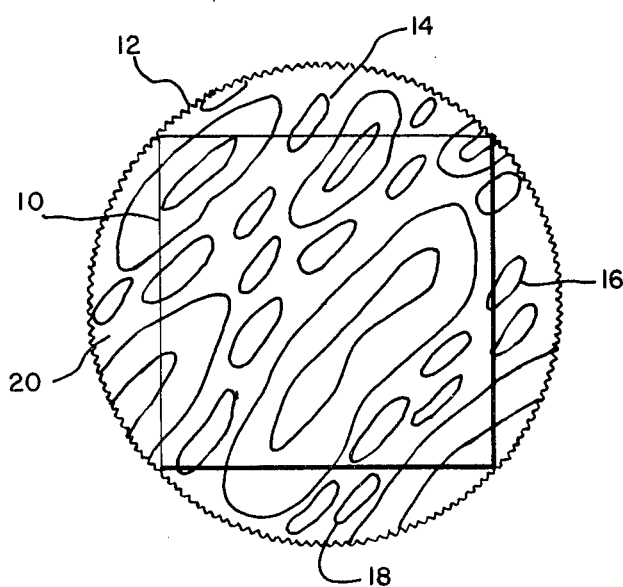
FIG. 2 illustrates how filling a rectilinear film format with a circular image results in four chordal image segments outside the film format.

The concepts of this invention are best understood by reference to FIG. 2. FIG. 2 represents a microscope image of a stylized biological specimen superimposed on a square photosensitive film unit. A square boundary 10 represents the rectilinear format of a commercial photographic film unit suitable for use in a self-contained camera coupled to an imageforming optical instrument. For aesthetic, as well as other considerations, the instrument and the camera are matched so the instrument's image will fill the corners of the rectilinear film format. However, the typical image-forming optical instrument, e.g., a microscope, has a circular image field 12. The circularity mainly results from the rotationally symmetric nature of most optical elements. To fill the rectilinear film format 10, the circular image field 12 must have a diameter at least equal to a diagonal of the rectilinear format 10. This results in four chordal segments 14, 16, 18 and 20 of the instrument's image that fall outside the boundaries of the film format 10. Previously, in instrument cameras, they have gone unused and provisions have had to be made to absorb the light destined for the chordal segments.

The present invention recognizes that the brightness of the image in the chordal segments 14, 16, 18 and 20 is indicative, in most cases, of the image's brightness within the rectilinear film boundary 10. Therefore, light from the image-forming optical instrument destined to form one or more of the chordal segments 14, 16, 18 and 20 or of an unused portion of any other shape can be profitably diverted to the automatic exposure control of a camera without stealing light from the useful (recorded) image area within the film format boundary 10 and without superimposing a light sensing probe on the useful image.

Figure 1:
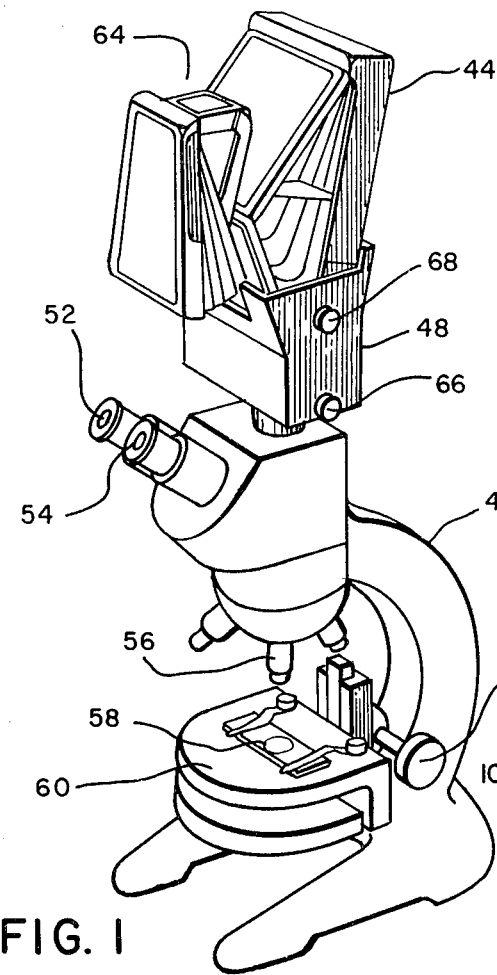
FIG. 1 illustrates a photographic camera attached to an image-forming optical instrument.

FIG. 1 illustrates a microscope 40 fitted with a novel fully automatic SX-70 Land Camera 44 sold by the Polaroid Corporation. The figure illustrates an adaptor 48 for joining such a camera to the phototube of the microscope 40. The SX-70 Land Camera 44 has an automatic exposure control utilizing a photodetector that looks in the same direction as the objective lens but is laterally displaced in the shutter housing from it. The means for diverting light intended for the chordal segments of the image formed by the microscope 40 is described below.

Though these and other figures show the invention used with an SX-70 Land Camera, the reader will understand that the invention can be used with any self-contained camera having an automatic exposure control with its photocell offset from the camera's optic axis, e.g., Colorpack II and Model 300 Series Land Cameras. Moreover, this invention can also be used to direct light to a photocell on a camera not having automatic exposure control, but with an integral light meter instead, or to feed light to an independent light meter.

The microscope 40 shown in FIG. 1 is a conventional binocular type with a third, vertical, tube for photographic use. Within the microscope 40 is a means (not shown) such as a movable mirror or prism that, in one position, directs the image to the eye-pieces 52 and 54 or, in another position, allows the image to enter the vertical tube.

The following procedure explains one method for using the self-contained SX-70 Land Camera on the microscope 40. An eyepiece, not shown, is inserted in the vertical phototube of the microscope 40. The eyepiece in combination with the microscope 42's objective 56 forms a magnified virtual image of the subject 58 stationed on the microscope stage 60. Microscope optics are conventionally designed to form the magnified virtual image at an apparent distance of about 50 centimeters or so below the eyepiece. That distance is well within the close-up focusing capability of the SX-70 Land Camera 44.

The SX-70 Land Camera 44 positioned by the adaptor 48 over the vertical phototube receives the virtual image of the subject 58 emerging from the eyepiece. Its objective lens forms a real image of the subject 58 on its focal plane. The most convenient means for focusing the real image on its focal plane is the focusing knob 62 of the microscope 40. Turning the knob 62 will adjust the focus of the real image at the focal plane. The microscopist can observe the image through the viewer 64 of the camera 44 while he turns knob 62 to focus it. Good photographic results are achieved by setting the SX-70 Land Camera for focus at a distance of about one meter, the focal distance for which its objective lens performs best, and using the knob 62 to focus the image on the camera's focusing screen.

Experiments indicate that many microscope eyepieces magnify the microscope's objective 56's image enough to fill the corners of the film format with the camera's objective focused at about one meter. In some instances, the eyepiece regularly supplied by a microscope manufacturer will not completely fill the corners of the SX-70 Land Camera's film format. This can be corrected to some extent by adjusting the camera's objective lens to focus closer than one meter. It is preferable, though, to use a wide angle eyepiece in the vertical phototube, instead. Wide angle eyepieces are readily available. Ideally, the field of view subtended by the optics of the camera and the microscope will slightly overfill the film format area so the alignment between the camera and microscope is not important to filling the corners of the format. Those skilled in the art will now understand that the foregoing procedure and the holder will also work quite well with a plain monocular microscope and the following explanation is applicable to such an arrangement too.

In the foregoing arrangement for coupling the SX-70 Land Camera 44 to the microscope 40, the place to divert some of the light otherwise destined to form the aforementioned unused chordal image segments for operating the camera's automatic exposure control is the separation between the camera's objective lens and the microscope's eyepiece. (see FIG. 3). The holder, or adaptor, 48 can be constructed to provide such a separation when it mates the camera 44 to the microscope 40.

The adaptor 48 has two knobs 66 and 68. The lower knob 66 controls a clamp (not shown) that locks the adaptor 48 onto the vertical phototube of the microscope 40. The upper knob 68 adjusts the position of the optical means (not shown in FIG. 1) that diverts the light from a chordal segment to the automatic exposure control of the camera 44. This position adjustment is an optical feature to maximize the transfer of chordal segment light into the automatic exposure control, but it is not necessary for the proper operation of the invention. It can adjust the sensitivity of the automatic exposure control by varying the amount of chordal light reaching the photodetector through the optical means.

Figure 3:
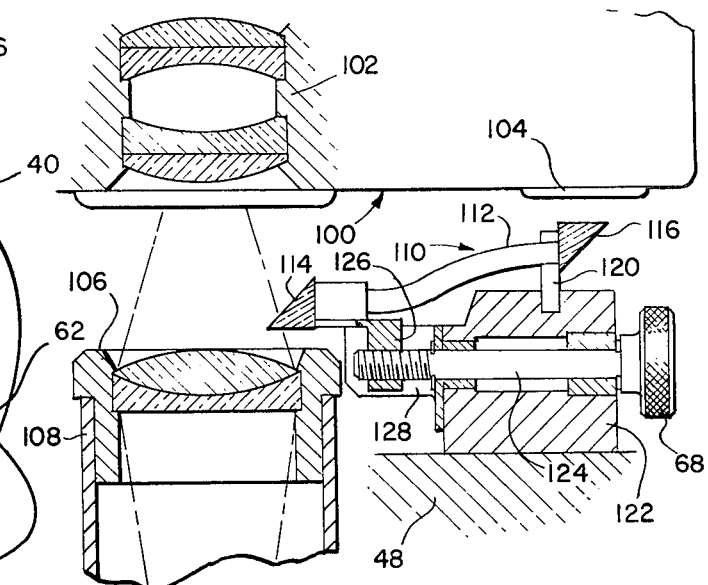
FIG. 3 illustrates a means for using the light content of a chordal image segment to operate an automatic exposure control.

Reference should be had to FIG. 3. It illustrates a portion of an embodiment of the invention adapted for use between a microscope and a self-contained camera with its own automatic exposure control. A shutter housing 100 contains an objective lens 102 and an automatic exposure control that receives light through a window 104. An adaptor, such as the adaptor 48 of FIG. 1, supports the camera so the shutter housing 100 is spaced apart from an eyepiece 106, in the vertical phototube 108 of a microscope, with the objective lens 102 and the eyepiece 106 coaxial to each other. Light emerges from the eyepiece 106 directed toward its exit pupil. Optical means 110 comprising a fiber optic light conduit 112 and light deflecting right angle prisms 114 and 116 attached to each end of the light conduit 112. The right angle prism 114 intrudes into the optical path between the eyepiece 106 and the lens 102 and extracts light from the beam coursing across the separation. The conduit 112 transmits that light to the second right angle prism 116 that directs it through the window 104 into an automatic exposure control.

The optical means 110 is supported at one end by a bracket 120 attached to shaft guide 122. The shaft guide 122 can be made as an integral part of the adaptor 48 or added to it. Running through the shaft guide 122 is a screw shaft 124 with the knob 68 attached to its outer end. The screw shaft 124 is mounted within the shaft guide so it is free to rotate but so it will not move axially. Threaded onto the inner end of the screw shaft 124 is a support 126 for the right angle prism 114. The slide guide 128 prevents the support 126 from rotating.

One adjusts the position of the prism 114 by turning the knob 68. That causes the prism 114 to move into, or out of, the optical path between the eyepiece 106 and the lens 102 in a controlled manner. The flexible nature of the light conduit 112 allows the optical means 110 to adjust readily to the change.

This positional adjustment provides the user with control over the amount of light diverted into the camera's photo exposure control and is thus an additional means of exposure control. A skilled mechanic will now understand how to construct this or some other device for controlling the intrusion of the optical means 110 into the optical path.

Orienting the edge of the prism 114 in the optical path parallel with an edge of the film format insures that it will only intercept a chordal segment of the microscope's circular image and not a part of the image that will lie within the rectilinear boundary of the film.

In addition to the preceding criterion for positioning the prism 114, a further criterion is to locate the prism 114 toward the edge of the aperture (rightward in FIG. 3) through which image-forming light rays emerge from the eyepiece 106. The prism 114 need be located no closer to the edge than is required to insure that it will not cast its shadow onto a useful part of the film's rectilinear format.

An arrangement, as illustrated in FIG. 1, using an SX-70 Land Camera makes the last position easy to obtain. The user has merely to watch through the viewer 64 as he positions the prism 114. He can see if the prism 114's edge is parallel to the format's edge and, if it casts an unwanted shadow, make appropriate adjustments. Parallelism permits diverting a maximum amount of light without intruding the prism 114 into a photo. In the case of a non-reflex camera, a series of trial exposures aid in empirically positioning the prism 114. Alternatively, its location can be fixed by appropriate engineering design with reference to specifications of a specific camera and microscope and holder.

It will be understood that variations and modifications of the invention are possible in light of this disclosure, and it will be apparent to those skilled in the art that various changes in form and arrangement may be made to suit specific requirements without departing from the spirit and scope of the invention. Therefore, it is to be understood that within the scope of the appended claims, the invention may be practiced in a manner than otherwise specifically described herein.

What is claimed is:

1. An apparatus for determining the brightness of a scene imaged by an optical instrument for the purpose of controlling the exposure of a camera positioned to record the image of said scene, said apparatus comprising:
   means in the optical path between said instrument and said camera for diverting from said path, from the optical path between said instrument and a portion of any light from said instrument destined to reach the focal plane of said camera at a location outside the boundary of said camera's film format;
   means for conveying said portion away from said diverting means; and
   means for emitting said portion onto a light sensor.

2. The apparatus described in claim 1 wherein said light sensor is operatively associated with an automatic exposure control incorporated into said camera.

3. The apparatus described in claim 1 wherein said conveying means is a fiber optic light conduit and said diverting means is a prism operatively joined to an end of said fiber optic light conduit.

4. The apparatus described in claim 3 wherein said emitting means is a second prism joined to another end of said fiber optic light conduit.

5. An adaptor comprising:
   attaching means for joining a camera to an image-forming optical instrument in optical alignment therewith so as to allow said camera to photograph an image formed by said instrument, said attaching means including means for providing a separation between the objective lens of said camera and the exit window of said optical instrument through which said image emerges;
   means, insertable into said separation, for diverting, from the optical path between said instrument and said camera, a portion of any light from said instrument destined to reach the focal plane of said camera at a location outside the boundary of said camera's film format;
   means for conveying said portion away from said diverting means; and
   means for emitting said portion onto a light sensor.

6. The adaptor described in claim 5 wherein said light sensor is operatively associated with an automatic exposure control incorporated into said camera.

7. The adaptor described in claim 5 wherein said conveying means is a fiber optic light conduit and said diverting means is a prism operatively joined to an end of said fiber optic light conduit.

8. An adaptor, by means of which a selfcontained photographic camera with an automatic exposure control can be used for recording an image formed by an optical instrument, comprising:
  attaching means for joining said self-contained photographic camera to said optical instrument in optical alignment therewith so as to allow said camera to photograph said image, said attaching means including means for providing a separation between the objective lens of said camera and the exit window of said optical instrument through which said image emerges; and
  optical means for communicating between said separation and said automatic exposure control, said optical means including an entrance face to intercept at least a portion of a chordal segment of said image from the image as it courses through said separation from said instrument to said camera, an optical conduit for directing the light in the extracted chordal segment portion to the vicinity of said automatic exposure control and an exit face to direct said light from said optical conduit into said automatic exposure control.

9. The adaptor described in claim 8 wherein said attaching means includes:
  clamping means for releasably joining said attaching means to said optical instrument;
  retaining means for releasably receiving said camera.

10. The adaptor described in claim 9 wherein said optical means includes:
  a fiber optic light conduit connecting said entrance and said exit faces.

11. Adaptor described in claim 10 wherein said entrance and exit faces consist of prisms joined to the ends of said fiber optic light conduit.

12. The adaptor described in claim 8 further comprising:
  adjusting means for controlling the amount of said chordal segment intercepted by said entrance face.

13. An adaptor for functionally joining a self contained photographic camera to an image forming optical instrument, said adaptor comprising:
  attaching means for joining said camera to said optical instrument so that the image formed by said optical instrument may be photographed by said camera, said attaching means including clamping means for releasably locking said attaching means to said optical instrument, retaining means for releasably receiving said camera, and means for providing a separation between said camera and the opening in said optical instrument through which said image emerges;
  optical means for communicating between said separation and a light sensor, said optical means including a prism for intercepting at least a portion of said image as said image courses from said optical instrument to said camera, and a fiber optic light pipe for receiving said portion from said prism and conducting it to said light sensor; and
  adjusting means for controlling the position of said prism and thereby the size and location of said portion.

14. A method comprising the steps of:
  optically coupling a self-contained camera to an image-forming optical instrument so an image formed by said instrument is in focus on the film plane of said camera;
  diverting, at the optical interface between said camera and said instrument, at least part of any light forming a portion of said image otherwise lying outside the boundary of the photographic format employed at said film plane; and
  receiving said light on a photodetector.

15. The method described in claim 14, comprising the additional step of:
  operating the exposure control of said camera according to the signal generated by said photodetector on receiving said light.

16. A method comprising the steps of:
  optically coupling a self-contained camera having an automatic exposure control to an optical instrument so said self-contained camera can record, on a photosensitive surface, an image formed by said optical instrument;
  adjusting said self-contained camera and said optical instrument so said image essentially fills said photosensitive surface and portions of said image lie outside the useful boundaries of said photosensitive surface;
  diverting at least some of the light intended for one of said portions before it enters said camera; and
  relaying said light diverted from said one of said portions to a light sensor operatively associated with said automatic exposure control.

17. A method comprising the steps of:
  forming an image with an area greater, than the area of a photosensitive surface intended for receiving said image so a portion of said image will fall outside the boundary of said photosensitive surface;
  diverting at least some of the light forming said portion before it reaches the vicinity of said photosensitive surface; and
  relaying the diverted said light to a light sensor.

18. The method described in claim 17, comprising the further step of:
  operating an automatic exposure control, functionally associated with a camera containing said photosensitive surface, by means of a signal emanating from said light sensor.

19. An adaptor, for use with a self-contained photographic camera operatively associated with an image-forming optical instrument so as to photograph the image formed by said instrument, comprising:
  attaching means for joining said self-containing photographic camera to said image-forming optical instrument in optical alignment therewith; and
  optical means for communicating between the optical path, from said instrument to said self-contained camera, and a light sensor, said optical means comprising, a fiber optic light conduit having an entrance face and an exit face, said entrance face being locatable at the edge of an exit window in said instrument, through which a bundle of light rays emerge that form said image at the focal plane of said self-contained camera, so as to intercept certain light rays, at the edge of said bundle that form a part of said image that would lie outside the boundaries of the photographic format of said self-contained camera, and said exit face being locatable proximate a light sensor so said exit face will emit onto said light sensor the light rays said fiber optic light conduit receives through said entrance face.

* * * * *